US009329983B2

(12) United States Patent
Arcese et al.

(10) Patent No.: US 9,329,983 B2
(45) Date of Patent: *May 3, 2016

(54) COMPUTER PROGRAM TESTING

(71) Applicant: International Business Machines Corporation, Armonk, NY (US)

(72) Inventors: Mauro Arcese, Rome (IT); Pier F. Bottan, Rome (IT); Giorgio Corsetti, Rome (IT)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/667,992

(22) Filed: Mar. 25, 2015

(65) Prior Publication Data

US 2015/0199264 A1 Jul. 16, 2015

Related U.S. Application Data

(63) Continuation of application No. 13/941,580, filed on Jul. 15, 2013, now Pat. No. 9,053,240, which is a continuation of application No. 13/400,737, filed on Feb. 21, 2012, now Pat. No. 8,522,211, which is a continuation of application No. PCT/EP2010/055836, filed on Apr. 29, 2010.

(51) Int. Cl.
*G06F 9/44* (2006.01)
*G06F 11/36* (2006.01)
*G06F 11/28* (2006.01)
*G06F 9/54* (2006.01)

(52) U.S. Cl.
CPC .............. *G06F 11/3688* (2013.01); *G06F 8/70* (2013.01); *G06F 9/542* (2013.01); *G06F 11/28* (2013.01); *G06F 11/3672* (2013.01)

(58) Field of Classification Search
None
See application file for complete search history.

(56) References Cited

U.S. PATENT DOCUMENTS 5,394,347 A 2/1995 Kita et al.
6,907,546 B1 * 6/2005 Haswell et al. ............ 714/38.11
(Continued)

FOREIGN PATENT DOCUMENTS

WO 2008092162 A2 7/2008
WO 2011023424 A1 3/2011

OTHER PUBLICATIONS

Ambler, Scott W., Agile Modeling, "UML 2 State Machine Diagrams", XP007913733, Ambysoft Inc., www.agilemodeling.com/artifacts/stateMachineDiagram.htm, 2004.
Ambler, Scott W., "The Object Primer 3rd Edition", Agile Model Driven Development with UML 2, Ambysoft Inc., www.ambysoft.com/theObjectPrimer.html, 2004.
(Continued)

*Primary Examiner* — Chuck Kendall
(74) *Attorney, Agent, or Firm* — Thomas E. Lees, LLC (57) ABSTRACT

To centrally manage execution of tests of software in an event oriented manner, a test execution engine reads a first test case from a test case component, where the test case represents tasks that have to be run to test a first procedure of a software program under evaluation. Further, the test execution engine identifies a participant node configured for sending events to an event queue and obtains events from the event queue. With those obtained events, the test execution engine evaluates whether the first procedure of the software program executed successfully and indicates whether the first procedure executed properly. The participant node has a node agent transmits events about the procedure and the first test case to the event queue.

10 Claims, 6 Drawing Sheets

(56) References Cited

U.S. PATENT DOCUMENTS

| | | |
|---|---|---|
| 7,490,319 B2 | 2/2009 | Blackwell et al. |
| 7,665,068 B2 | 2/2010 | Neumann et al. |
| 7,979,846 B2 | 7/2011 | Grechanik et al. |
| 7,992,133 B1 * | 8/2011 | Theroux et al. ............... 717/124 |

OTHER PUBLICATIONS

Notification of Transmittal of the International Search Report and the Written Opinion of the International Searching Authority for PCT Application No. PCT/EP2010/055836; Mailing Date of Jul. 16, 2010; European Patent Office, Rijswijk, Netherlands.

* cited by examiner

COMPUTER PROGRAM TESTING

BACKGROUND

Various aspects of the present invention relate to testing a computer program in an event oriented manner.

Test automation frameworks usually provide tools integration, legacy tools support, ease of use, data integration, reporting features, shell script support, automatic environment setup, remote command execution, etc.

However, the definition of the test flow is deficient as it is not very flexible. This definition, regardless of whether it uses proprietary language for testing or general scripting language, is a sequence of synchronous actions, more or less complex, that an engine has to execute to complete the test case. Each action is usually represented by the invocation of a method of a class or by the execution of a Command-line Interface (CLI) command on a remote or local machine and the subsequent check of the related result code returned by that invocation. Then according to such result, the next step is executed to continue with the test case or an error is thrown to report the failure. Complex testing scenarios cannot be implemented by such testing frameworks.

BRIEF SUMMARY

According to various aspects of the present invention, approaches are provided to centrally manage the execution of tests of software in an event oriented manner. A test execution engine reads a first test case from a test case component, where the first test case represents tasks that have to be run to test a first procedure of a software program under evaluation. Further, the test execution engine identifies a participant node configured for sending events to an event queue. The test execution engine provides to the identified participant node, a test case definition of the first test case. The test case definition corresponds to a first event which, when detected, indicates that the first test case should be evaluated. The test execution engine obtains events from the event queue. The test execution engine evaluates the obtained events to determine whether the first procedure of the software program under evaluation executed successfully and indicates whether the first procedure executed properly. The participant node has a node agent that registers a first event handler for detecting the occurrence of the first event, detects the occurrence of the first event, and evaluates a first logical function with the first event as input, in response to the detection of the first event. Also, the participant node decides whether the first condition is met, the decision being a function of the evaluation of the first logical function and sends an event message to the event queue based upon whether the first condition is met.

BRIEF DESCRIPTION OF THE SEVERAL VIEWS OF THE DRAWINGS

Embodiments of the present invention will now be described by way of example with reference to the accompanying drawings in which like references denote similar elements, and in which.

DETAILED DESCRIPTION

According to a first aspect of the present invention, there is provided a method for testing a procedure of a software program, said procedure being suitable for annunciating whether it executed successfully or not, said method comprising the steps of:

adapting said computer program with a first executable component for altering the execution of said computer program, said first executable component being configured for generating a first event to announce the occurrence of said alteration;

receiving a first test case, comprising:

a first event definition, corresponding to said first event which, when detected, said first test case should be evaluated, a second executable component identifier, and a first logical function, representing a first condition which must be met for executing said second executable component;

registering a first event handler for detecting the occurrence of said first event;

detecting the occurrence of said first event;

evaluating said first logical function with said first event as input, in response to said detection of said first event;

deciding whether said first condition is met, said decision being a function of the evaluation of said first logical function;

in a case where it is decided that said first condition is met, carrying out the further step of requesting the execution of said second executable component; and determining whether said procedure has executed successfully, in response to the execution of said second executable component.

A first advantage of this aspect is that the procedure can be tested in an asynchronous manner, so that other procedures can be tested at the same time by the same system implementing the method. A further advantage is that the definition of the test to be run is very flexible and can be modified at any time, even while the test of the procedure is running After updating the test case (or the test cases dependencies) the system would be able to re-evaluate the dependencies and decide if new steps have to be triggered by re-processing both the already received events and the new incoming ones. Yet another advantage is that sequences of test cases can be arranged and modified in a flexible manner, for example by changing the dependencies between them, even when the test is running In a first development of the first aspect, the alteration occurs when a predefined instruction in said computer program is executed.

A further advantage of this aspect is that the control of the program can happen at any time.

In a second development of the first aspect, the predefined instruction is an exception or a time out.

Another advantage of this aspect is that situations which may not be anticipated by the normal program flow can also be controlled.

In a third development of the first aspect, the first event comprises:

an identifier uniquely representing the event;

a predefined value representing the state of the component generating the event; and a second identifier uniquely representing said test case.

Yet another advantage of this aspect is that it is easy to correlate the received event with the corresponding test case.

In a fourth development of the first aspect the second executable component is synchronous, or asynchronous.

A further advantage of this aspect is that the call to the second executable component can be tailored to the need of the test environment. In the case of an asynchronous call, the call to the executable component would not wait for the execution to finish, thus optimizing the test system resources.

In a fifth development of the first aspect the second executable component is the computer program comprising the procedure to be tested.

An additional advantage of this aspect is that it is possible to test in a flexible manner the reaction of the procedure to be tested to the alteration of the computer program by the first executable component.

In a sixth development of the first aspect the first executable component is a hook agent.

A further advantage of this aspect is that the hook agent could modify how the computer program interacts with another program without any alteration to the computer program.

In a seventh development of the first aspect the alteration caused by said first executable component is a system exit during a file download.

An advantage of this aspect is that the simulated situation is a worst case scenario wherein the computer program cannot gather any information on why the file download failed.

In an eighth development of the first aspect the procedure to test is adapted for restarting the file download which failed.

Another advantage of this aspect is that the procedure which is tested does not need to be correlated to the executable component which made the file download to fail.

According to a second aspect of the present invention, there is provided an apparatus comprising means adapted for carrying out each step of the method according to the first aspect of the invention.

An advantage is that this apparatus can be obtained very easily, thus making the method easy to execute.

According to a third aspect of the present invention, there is provided a computer program comprising instructions for carrying out the steps of the method according to a first aspect of the invention when said computer program is executed on a computer.

An advantage is that the invention can easily be reproduced and run on different computer systems.

According to a fourth aspect of the present invention, there is provided a computer readable medium having encoded thereon a computer program according to the third aspect of the invention.

An advantage is that this medium can be used to easily install the method on various apparatus.

Further advantages of the present invention will become clear to the skilled person upon examination of the drawings and detailed description. It is intended that any additional advantages be incorporating therein.

Figure 1:
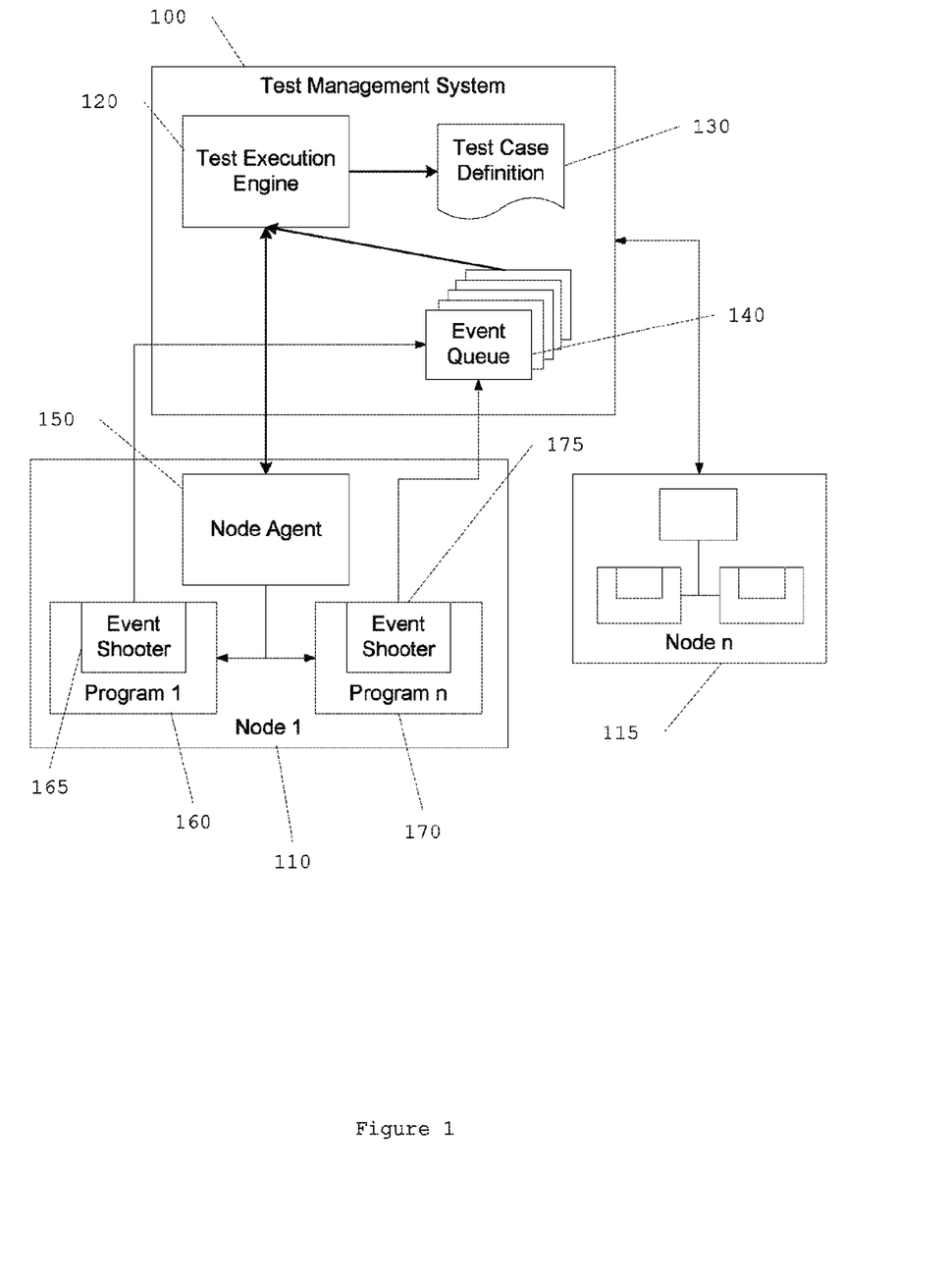
FIG. 1 shows a high level view of a system comprising a test engine for testing a computer program executed at a particular node.

FIG. 1 shows a high level view of a system comprising a test engine for testing a computer program executed at a particular node, the system comprising:
  a test management system 100, comprising a test execution engine 120 adapted to process a test case 130 and an event from an event queue 140;
  a first node 110, comprising a node agent 150, a first computer program 160 adapted with a first event shooter 165, and optionally comprising one or more other programs 170 adapted with another event shooter 175;
  optionally another node 115 which can be similar to the first node 110.

The test execution engine 120 centrally manages the execution of the tests and coordinates the activities of all the actors of the system. It reads the definition of a provided test case 130 and manages the execution of the tasks belonging to the test case 130 according to the events retrieved from the event queue 140 and to the outcome of the execution of each single step of the test case 130.

The test case 130 component is a representation of the tasks that have to be run by the test execution engine 120 to perform a specific test. A test case 130 defines also the criteria to infer if a test completes successfully or not. The test case 130 is described in more details with respect to FIG. 2.

The event queue 140 is the receiver for the events sent by the participant nodes 110, 115 during the execution of a test case 130. The events in such queue 140 are retrieved and processed by the test execution engine 120. The order in which the events are de-queued from the event queue 140 can be first in—first out, first in—last out, an order taking into account the priority of the event as set by the event shooter 165, 175. Alternatively, the test execution engine 120 can search the event queue 140 to find the next expected event as defined in the test case 130, and retrieve the event in an order not linked at all to the order in which the events were received.

The node agent 150 is an element which can be installed on each node 110, 115 participating to the execution of a test case 130 that is managed by the test execution engine 120. It is used by the test execution engine 120 to remotely perform several kinds of tasks, such as remote command execution, file transfer operations, etc. The node agent 150 allows remote method invocation from the test execution engine 120. Possible communication means between the test execution engine 120 and the node agent 150 include RMI-IIOP, JRMP, JMS, SMS, emails, REST requests, SOAP messages, etc.

The event shooter 165 sends events to the event queue 140 when a specific situation occurs. Typically this element is able to intercept the activities performed by a specific program 160 under test. In a preferred embodiment, if the program 160 under test is an agent that has to communicate with a server, the event shooter 165 can be a hook that intercepts the communications between such agent and the server. When specific messages are sent by the agent to the server, the hook can send to the event queue 140 an event to indicate such situation. The event shooter 165 can simulate many of the environmental conditions that usually occur in a typical production environment that are difficult to recreate in a development environment, such as: loss of network connectivity, unavailability of a needed service provider, abrupt crash of the application, etc. Moreover, leveraging capture and replay capabilities, the event shooter 165 can enable execution of several instances of a test case by enforcing the same generation of unexpected events during each run, providing in this way the possibility to debug and analyze any potential problem more accurately. More generally, the event shooter 165 component could also be an independent process that under certain conditions generates and sends events to the test execution engine 120. It is not necessary that the event shooter 165 be directly related to the program 160 under test, nor that it execute within the same thread or share the same process id.

Figure 2:
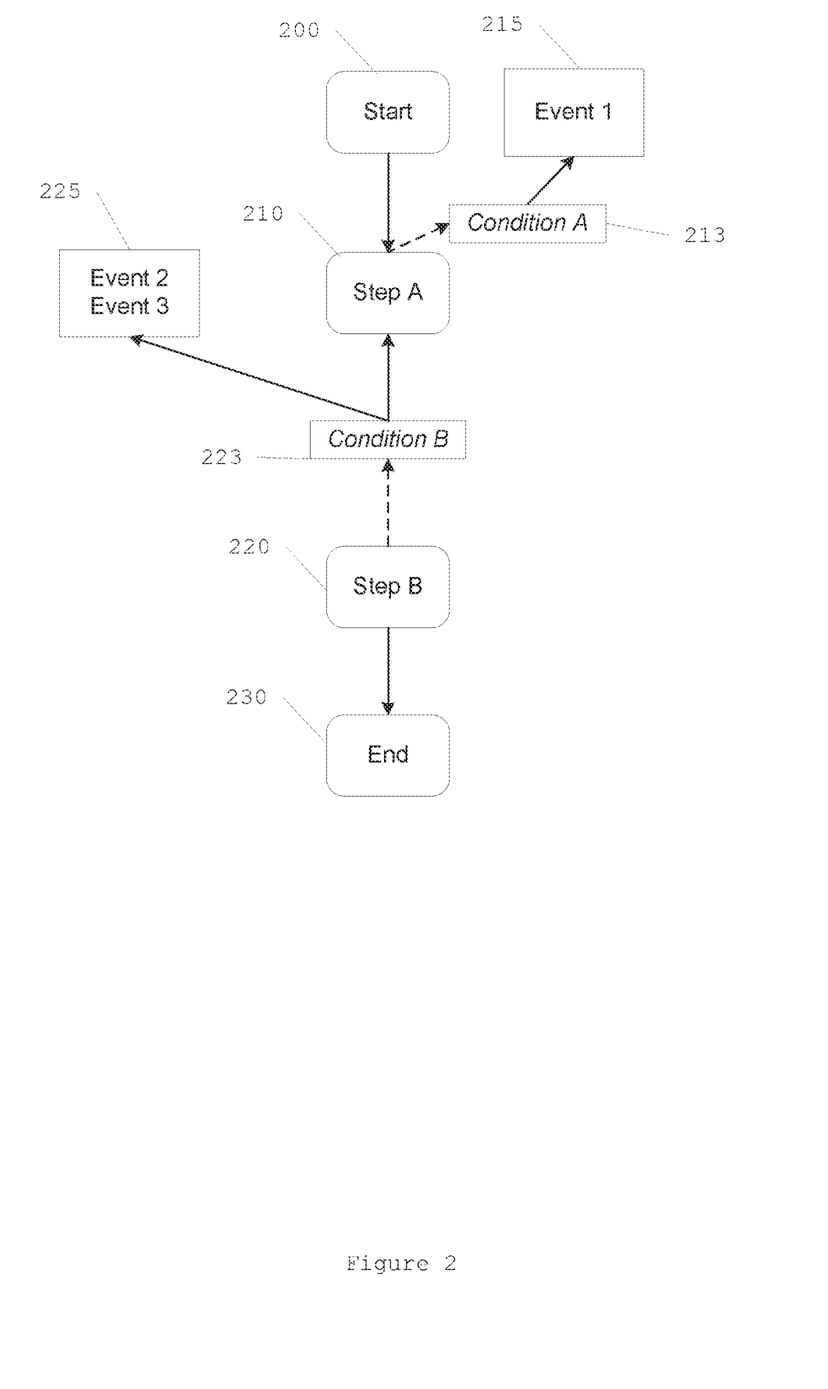
FIG. 2 shows a general example of a test case received by a test engine according to the present invention.

FIG. 2 shows a general example of a test case received by a test engine according to the present invention, comprising:
  a start node 200;

a node called 'Step A' 210 which requires that a 'Condition A' 213 is fulfilled in order to execute, the 'Condition A' 213 itself requiring the occurrence of an event called 'Event 1' 215;

a node called 'Step B' 220 which requires that a 'Condition B' 223 is fulfilled in order to execute, the 'Condition B' 223 itself requiring the occurrence of the events called 'Event 2 Event 3' 225 and of the completion of the execution of 'Step A' 210;

an end node 230.

The events 215, 225 defined in the test case correspond to events which can be generated by an event shooter 165, 175 as described with respect to FIG. 1. The detection by the test engine 120, during the execution of the test case, of a predefined 'Event 1' 215 or 'Event 2 Event 3' 225 in the event queue 140, triggers the evaluation of the respective 'Condition A' 213 or 'Condition B' 223, as defined by the test case.

Each event is a data structure and can have any of the following attributes:

an ID, which can be a string or an integer, for identifying uniquely an event;

a name;

a result, which corresponds to a predefined value in the form of a string or an integer, for indicating if the event has occurred and in which way it occurred;

a time of occurrence, for indicating when the event has occurred, its time of occurrence can thus be compared to the time of occurrence of other events, so that the test execution engine 120 can check a particular order of occurrence of the events for a condition of the test case to be satisfied;

a test case 130 ID, for identifying the test-case instance the event applies to. If it is not specified, the event will be automatically dispatched to all the test cases currently running inside the test execution engine 120.

Each step has a condition associated with it for specifying if and when that step can be executed. A condition is a logical function, with inputs defined in the test case, and a Boolean as output. Optionally fuzzy logic can be implemented by the condition so as to more accurately represent the state of the system and take finer decisions. The following conditions can be specified:

On-Success, which evaluates to true when the conditioning step completes successfully;

On-Failure, which evaluates to true if the conditioning step completes with a failure;

On-Completion, which evaluates to true as soon as the conditioning step completes regardless of its result;

On-Event-Sequence, which evaluates to true when a specific sequence of events is received. If the received sequence is different from the expected one, the related condition is not satisfied and the step will not execute. The 'Condition B' 223 is conditioned in such a way. This kind of conditioning can be very useful as a synchronization mechanism to decide when a specific step of the test case has to be executed in response to well defined events.

As a simple example of an application of this kind of conditioning, it would be possible to configure an event shooter 165 so that each time an exception is thrown inside the application a specific event is fired: in this way it would be possible to monitor/track all the exceptions thrown by the application and evaluate the final status of the test case also according to this criteria.

More than one condition can be specified for each step and all the conditions can be composed through Boolean operators ("AND" and "OR"). For example, the 'Condition B' 223 is conditioned by the complete execution of 'Step A' 210, and by the occurrence of 'Event 2 Event 3' 225. The test case can also define in which order the events 2 and 3 of 'Event 2 Event 3' 225 must occur and that 'Step A' 210 must complete for 'Condition B' 223 to evaluate to true.

If the condition specified for a given step is not satisfied, the step is not executed.

When a specific step is executed, the execution engine 120 can optionally pass as one of the input parameters of the invocation the condition object 223 or 213 and its status associated with the step. In this way the execution of the step may leverage such parameter to modify its behavior accordingly.

Each step 210, 220 represents an operation to be executed in the context of the test case. The executable component associated with a step can be identified by an ID, a URL, a URI, or any other resource or method locator. Each step has an associated outcome. According to the outcome of the execution of the action the next step can be executed or not.

At least two kinds of actions are possible:

Synchronous actions, which are represented usually by the invocation of a command line interface (CLI) command or the execution of a Java method (Java is a trademark of Sun Microsystems, Inc., in the United States, other countries, or both). The outcome of such actions is the result returned by the corresponding invocation.

Asynchronous actions are operations that run asynchronously. Usually they are started by invoking a CLI command that returns immediately after the operation has been submitted. The final result is in general available in a future moment in time. An example of an asynchronous task is the submission of a software distribution installation through a configuration manager product. Each asynchronous action sends an event to the event queue 140 to notify its completion. Upon detection of such an event in the event queue 140, the corresponding node (for example, the 'Step A' node) will update its status and the depending conditions ('Condition B' 223 in this case) will be re-evaluated.

Figure 3:
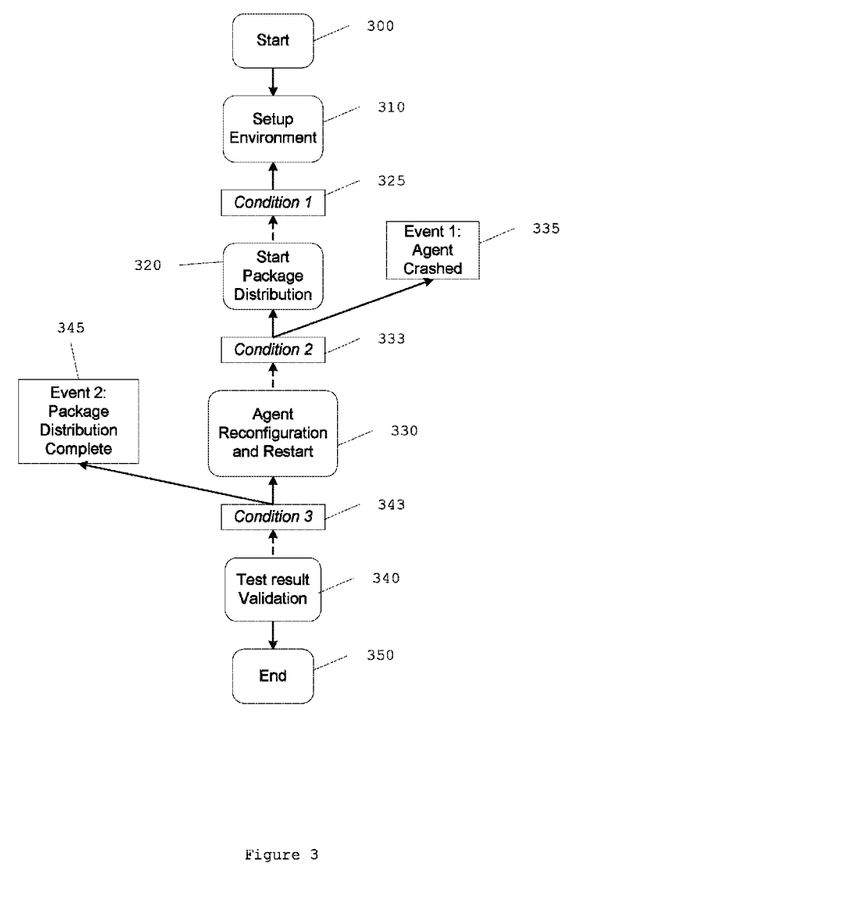
FIG. 3 shows an example of a file download test case received by a test engine according to the present invention.

FIG. 3 shows an example of a file download test case received by a test engine according to the present invention, comprising:

a start state 300;

a set up environment step 310, which is always executed as it is unconditional;

a start package distribution step 320;

a 'Condition 1' 325, whose positive evaluation triggers the execution of the start package distribution step 320;

an agent reconfiguration and restart step 330;

a 'Condition 2' 333, whose positive evaluation triggers the execution of the agent reconfiguration and restart step 330;

an 'Event 1' 335 corresponding to the crash of the agent, whose occurrence must be detected by the test execution engine 120 for 'Condition 2' 333 to evaluate positively;

a test result validation step 340;

a 'Condition 3' 343, whose positive evaluation triggers the execution of the test result validation step 340;

an 'Event 2' 345 corresponding to the package distribution being complete, whose occurrence must be detected by the test execution engine 120 for 'Condition 3' 343 to evaluate positively;

an end state 350.

The 'Condition 1' 325 requires that the set up environment step 310 has executed successfully. Successful execution of this step is ensured by the sending of a corresponding event by the executable component associated with the set up environment step 310. The execution engine 120 must thus check periodically the different events present in the event queue 140 so as to determine which condition function must be evaluated. It may happen that the occurrence of a single event triggers the positive evaluation of several conditions, which in turn triggers the simultaneous execution of several steps.

The 'Condition 2' 333 requires the detection of the 'Event 1' 335 and of the completion of the start package distribution step 320 to evaluate to true.

Similarly the 'Condition 3' 343 requires the detection of the 'Event 2' 345 and of the completion of the agent reconfiguration and restart step 330 to evaluate to true.

The test objective of this sample test case is to verify the recovery capability of a solution that furnishes a software distribution service, when the target abnormally closes the package download.

The test scenario will be described in more details with respect to FIG. 4. From a high level perspective, it starts with the general environment set up 310. In a preferred embodiment, this mainly consists in target 160 enabling hook code 165. The package distribution towards a target 160 is then initiated 320. As soon as the target 160 starts to receive software package, the hook code 165 causes it to crash and to shoot an event 335 to the test execution engine 120. If the hook code 165 executes in the same process as the target program 160, the event 335 is sent before the crash of the program 160 is caused, as the crash of the program 160 also causes the crash of the hook code or event shooter 165. The test execution engine 120 recognizes the event and makes the target 160 to restart without the hook code 165 enabled to cause the crash 330. Package distribution when finished causes the shooting of an event of completion to the event queue 140. After receiving the last event 345 or a believable timeout in case of general test case failure test execution engine validates test result 340 and test case ends 350.

Figure 4:
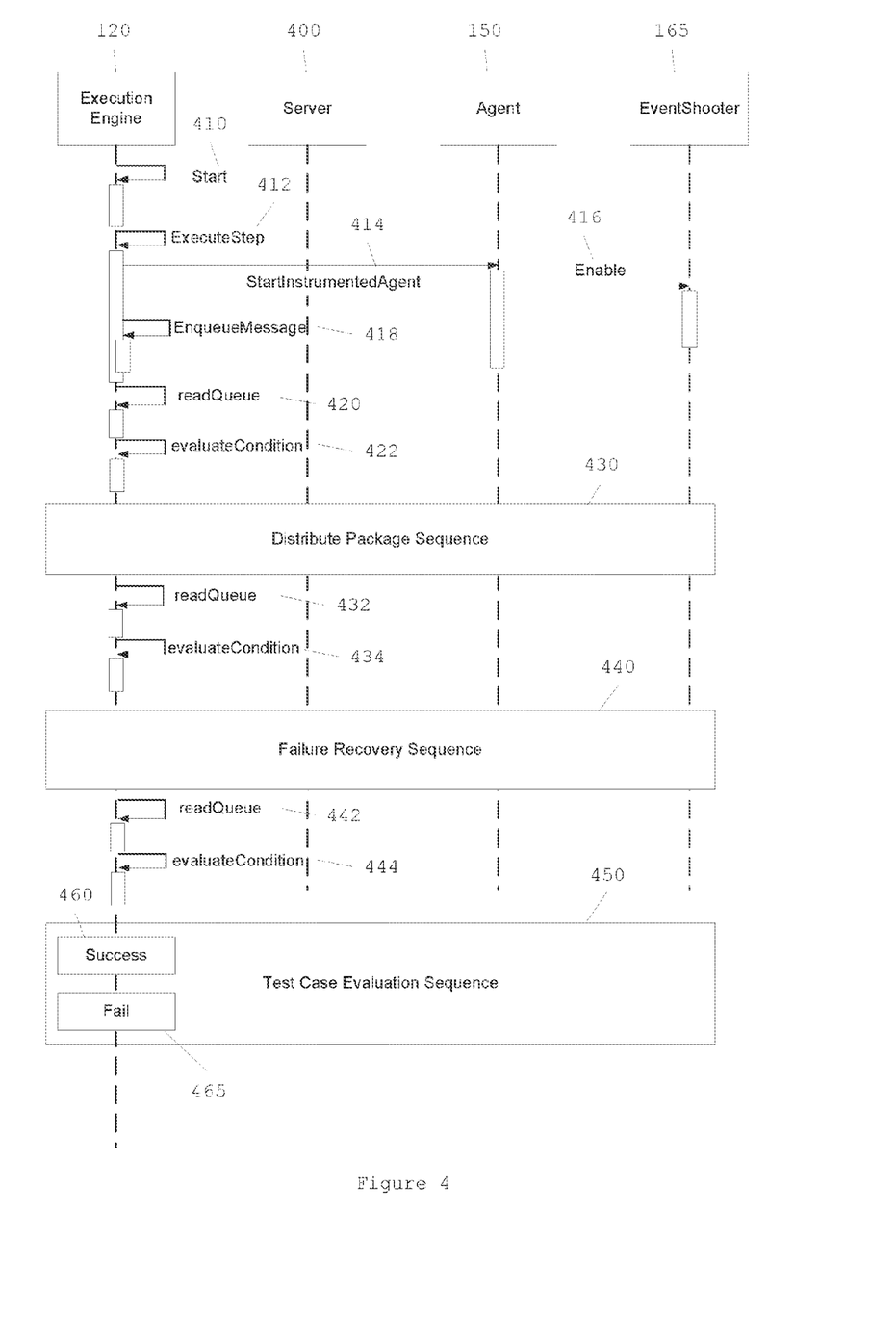
FIG. 4 shows a high level sequence diagram with the interactions between the different system components during the test of a computer program for downloading a file.

FIG. 4 shows a high level sequence diagram corresponding to the test case described with respect to FIG. 3, with the interactions between the different system components during the test of a computer program for downloading a file, comprising the following components:
  the test execution engine 120;
  a server 400 component;
  a node agent 150;
  an event shooter 165.

The test execution engine 120 drives the execution of the test based on the test case 130. The test execution engine 120 starts the test 410 in response to the detection of the start step 300 in the test case described with respect to FIG. 3.

The set up environment step 310 being the next step and being unconditional in the test case, the test execution engine 120 executes the step 412 and the executable component identified by this step in the test case. In particular the agent 150 is instructed to start by the test execution engine 120 by means of the asynchronous invocation of a startInstrumentedAgent 414 method. The agent 150 then enables 416 the event shooter 165. Without waiting for a status from the agent, the test execution engine 120 enqueues a message 418 or event in the event queue 140 to announce that the agent 150 was started.

The event can comprise the following information:
  type of the message: "scenario start";
  component which sent the message: "execution engine";
  result: "success".

The component monitoring the queue detects that the set up environment step 310 has been executed. The test execution engine 120 then reads the queue 420 and evaluates 422 the 'Condition 1' 325, as defined in the test case described with respect to FIG. 3. As 'Condition 1' 325 is fulfilled, the test execution engine 120 executes the start package distribution step 320. The distribute package sequence 430 will be described in more details with respect to FIG. 5.

Upon completion of this step, an event is fired by the event shooter 165 to announce a situation, and more particularly that the agent crashed 335. This event is detected and read from the queue 432. 'Condition 2' 333 is evaluated 434 to true. The failure recovery sequence 440 is then started. This sequence corresponds to the execution of the agent reconfiguration and restart step 330. The failure recovery sequence 440 will be described in more details with respect to FIG. 6.

Upon completion of this step, an event is fired to announce that the package distribution is complete 345. The event can comprise the following information:
  type of the message: "distribution end";
  component which sent the message: "server";
  result: "success".

This event is detected and read from the queue 442. 'Condition 3' 343 is evaluated 444 to true.

The test result validation step 340 is then executed and the test case evaluation sequence 450 is started to determine whether the component under test had the expected behavior. In particular the test execution engine 120 can verify that the event generated during the failure recovery sequence has the expected values corresponding to a successful test 460, and a failed test 465 otherwise.

The test is then ended 350.

Figure 5:
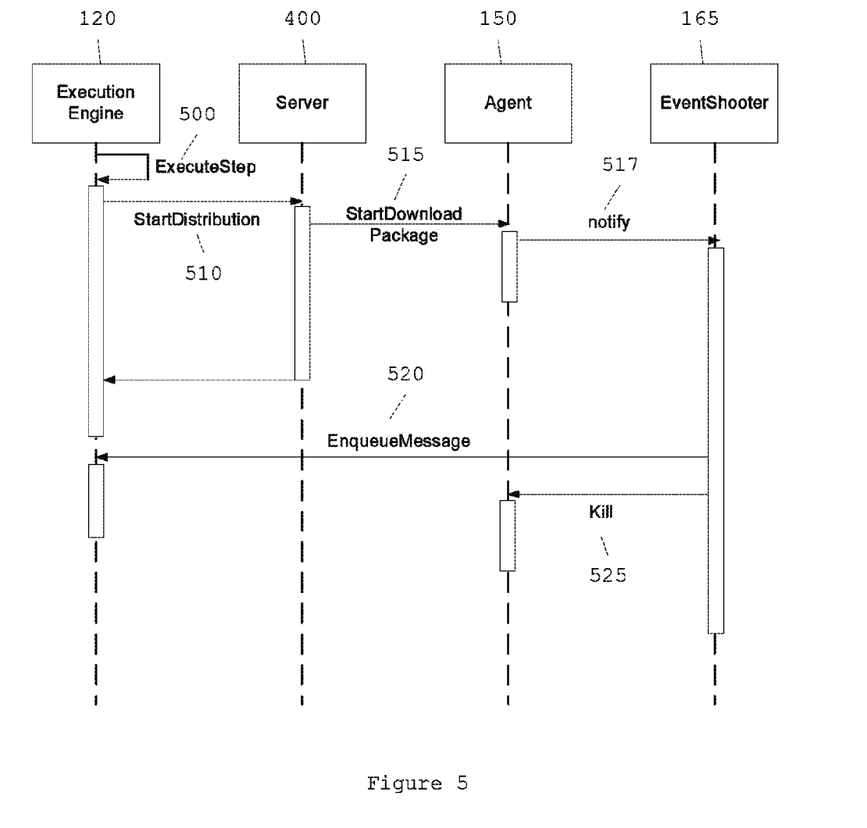
FIG. 5 shows a detailed view of a package distribution sequence diagram.

FIG. 5 shows a detailed view of a package distribution sequence diagram, comprising:
  the test execution engine 120;
  the server 400 component;
  the node agent 150;
  the event shooter 165.

The test execution engine 120 executes 500 the package distribution step 320. It instructs the server 400 to start the distribution 510 of the package. The package download 515 is then initiated. Alternatively, the agent 150 can request the download to start in response to a request from the test execution engine 120. The agent 150 notifies 517 the event shooter 165 that the package download has started. If the download completes successfully, the server 400 will enqueue a message in the event queue 140 corresponding to that situation. However, here the event shooter 165 is adapted to makes the agent crash during the download. The event shooter 165 thus enqueues 520 in the event queue 140 a message comprising the following information:
  type of the message: "agent killed during downloading";
  component which sent the message: "agent";
  result: "success".

The event shooter 165 then kills 525 the agent 150. In this example, the agent killing occurs after the message is sent, because the event shooter 165 executes in the same process as the agent 150. If the kill cannot occur for some reason, the event shooter 165 can send another event describing this situation. It is thus easy to correlate in the test case 130 the later message with the message announcing that the agent is going to be killed.

Figure 6:
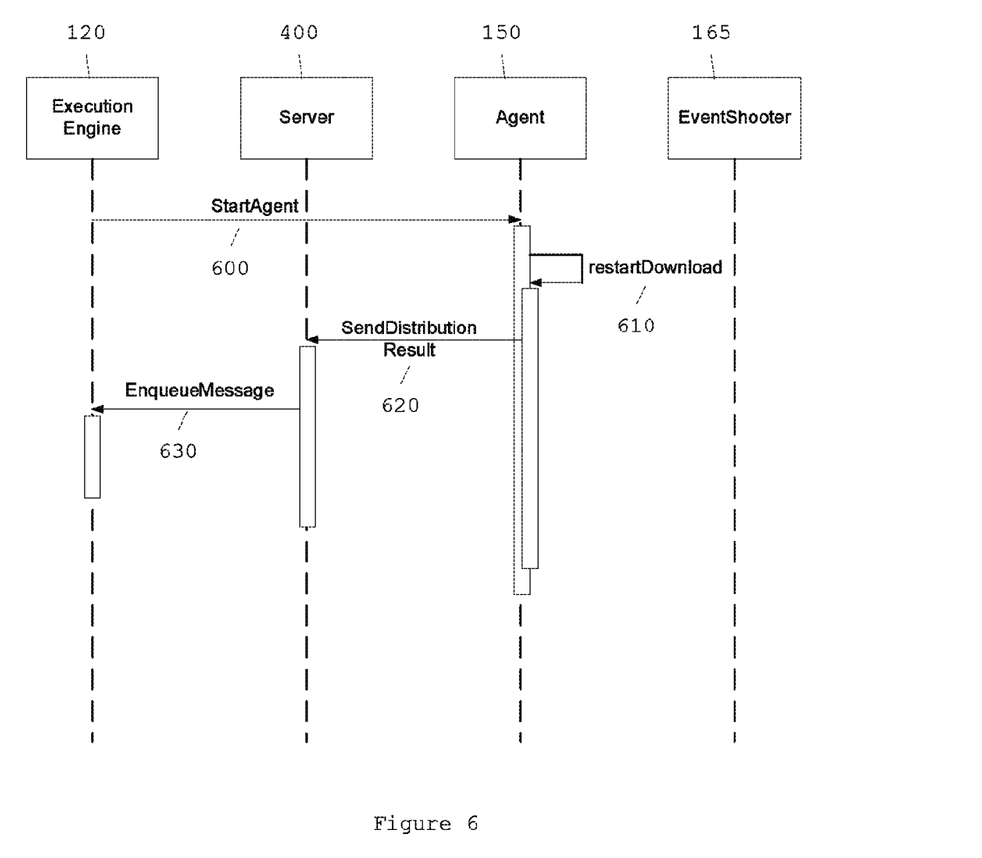
FIG. 6 shows a detailed view of a file download failure recovery sequence diagram.

FIG. 6 shows a detailed view of a file download failure recovery sequence diagram, comprising:
  the test execution engine 120;
  the server 400 component;
  the node agent 150;
  the event shooter 165.

The test execution engine 120 restarts 600 the agent 150. The goal is to test whether the agent 150 will be able to detect that a package download has crashed and to restart the download 610, and optionally resuming the download, thus avoiding transferring again the data already received by the agent 150.

Upon successful completion of the download, the agent 150 will notify the distribution result 620 to the server 400. The server 400 will then send an event 630 to the event queue 140 comprising:
- type of the event: "distribution end";
- component which sent the event: "server";
- result: "success".

Another embodiment comprises a method and system for testing a software component, by instrumenting the software component under test with a component able to modify the execution of the component under test and able to generate an event corresponding to the performed modification, and by verifying that the order and the content of the event received match a predefined sequence.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. Computer-readable hardware with a program for centrally managing the execution of tests of software in an event oriented manner stored thereon, wherein the program instructs a processor to perform:
   reading, by a test execution engine, a first test case from a test case component, where the first test case represents tasks that have to be run to test a first procedure of a software program under evaluation;
   identifying a participant node configured for sending events to an event queue;
   providing, by the test execution engine to the participant node, a test case definition of the first test case, the test case definition corresponding to a first event which, when detected, indicates that the first test case should be evaluated;
   obtaining events from the event queue;
   evaluating the obtained events to determine whether the first procedure of the software program under evaluation executed successfully; and
   indicating whether the first procedure executed properly;
   wherein:
   the participant node has a node agent for:
      registering a first event handler for detecting the occurrence of the first event;
      detecting the occurrence of the first event;
      evaluating a first logical function with the first event as input, in response to the detection of the first event;
      deciding whether the first condition is met, the decision being a function of the evaluation of the first logical function; and
      sending an event message to the event queue based upon whether the first condition is met.

2. The computer-readable hardware of claim 1, wherein the program further instructs the processor to perform:
   reading, by the test execution engine, a second test case from the test case component, where the second test case represents tasks that have to be run to test a second procedure of the software program under evaluation; and
   evaluating the obtained events to determine whether the first procedure of the software program executed successfully;
   wherein the first procedure and the second procedure are evaluated asynchronously.

3. The computer-readable hardware of claim 1, wherein the program further instructs the processor to perform modifying the first test case in the test case component while the first procedure is being evaluated.

4. The computer-readable hardware of claim 3, wherein the program further instructs the processor to perform:
   re-evaluate dependencies of the modified first test case; and
   determining if new steps must be triggered by re-processing events already received from the node agent and new events incoming from the node agent.

5. The computer-readable hardware of claim 1, wherein the program further instructs the processor to perform changing dependencies between the first test case and a second test case while the first test case is running.

6. The computer-readable hardware of claim 1, wherein identifying a participant node further includes:
   starting the participant node; and
   announcing that the participant node has started independent of a response from the participant node.

7. The computer-readable hardware of claim 1, wherein obtaining events from the event queue comprises:
   obtaining events from the event queue such that the events placed first into the event queue are the first events obtained.

8. The computer-readable hardware of claim 1, wherein obtaining events from the event queue comprises:
   obtaining events from the event queue such that the events placed first into the event queue are the last events obtained.

9. The computer-readable hardware of claim 1, wherein obtaining events from the event queue comprises:

obtaining events from the event queue based on a priority of the event as set by the participant node.

10. The computer-readable hardware of claim 1, wherein obtaining events from the event queue comprises:
obtaining events from the event queue by searching the event queue to find an expected event as defined in the first test case, independently of an order the events are placed in the event queue.

* * * * *